US006232577B1

(12) United States Patent
Reiff

(10) Patent No.: US 6,232,577 B1
(45) **Date of Patent: *May 15, 2001**

(54) APPARATUS AND METHOD FOR HEATING COLD ENGINES

(76) Inventor: Robert P. Reiff, S14 W31825 High Meadow La., Delafield, WI (US) 53028

( * ) Notice: Subject to any disclaimer, the term of this patent is extended or adjusted under 35 U.S.C. 154(b) by 0 days.

This patent is subject to a terminal disclaimer.

(21) Appl. No.: 09/466,489

(22) Filed: Dec. 17, 1999

Related U.S. Application Data

(63) Continuation-in-part of application No. 09/112,837, filed on Jul. 10, 1998, now Pat. No. 6,018,137.

(51) Int. Cl.[7] ........ B60L 1/02; F02N 17/02

(52) U.S. Cl. ........ 219/205; 123/142.5

(58) Field of Search ........ 219/205, 201, 219/544; 123/142.5, 145, 27 A

(56) References Cited

U.S. PATENT DOCUMENTS

| | | | | |
|---|---|---|---|---|
| 3,953,707 | | 4/1976 | Tanis | 219/205 |
| 4,135,079 | * | 1/1979 | McGraw | 219/327 |
| 4,575,003 | * | 3/1986 | Linker et al. | 237/12.3 R |
| 4,585,924 | * | 4/1986 | Pakula | 219/205 |
| 4,675,503 | | 6/1987 | Toivio et al. | 219/205 |
| 4,700,888 | * | 10/1987 | Samulak | 237/2 A |
| 4,776,529 | | 10/1988 | Tanis | 244/1 |
| 4,833,299 | * | 5/1989 | Estes | 392/444 |
| 4,971,576 | * | 11/1990 | Thimmesch | 439/502 |
| 5,017,758 | * | 5/1991 | Kirkman et al. | 219/205 |
| 5,040,703 | * | 8/1991 | Roark et al. | 222/173 |
| 5,196,673 | | 3/1993 | Tanis | 219/205 |
| 5,280,158 | * | 1/1994 | Matava et al. | 219/492 |
| 5,352,862 | | 10/1994 | Barr | 219/205 |

* cited by examiner

*Primary Examiner*—Philip H. Leung
*Assistant Examiner*—Daniel Robinson
(74) *Attorney, Agent, or Firm*—Donald J. Ersler

(57) ABSTRACT

An apparatus for heating a cold engine includes a cylinder band heater, a battery heater, an oil sump heater, and a wiring harness. The cylinder band heater includes a heating element, a tightening device, and a cylinder electrical connector. The tightening device is preferably a hose clamp, but could be any other type of tightening device which may be securely fastened around a cylinder. The heating element is attached to either the inside or outside of the tightening device with preferably some type of adhesive. A thermostat may be on the wiring harness. A battery heater includes a battery heater element, and a battery electrical connector. A thermostat is preferably included between the wiring harness and the battery heater to keep the temperature relatively constant. The wiring harness includes a power cord which is suitable for mating with an extension cord. The wiring harness preferably provides a connection to at least one cylinder band heater, a battery heater, and an oil sump heater. The cylinder band heater is tightened around the non-heat sink area of the cylinder. The battery heater may be attached to the battery or placed near the battery. The oil sump heater may be attached to the oil sump or placed near the oil sump.

36 Claims, 7 Drawing Sheets

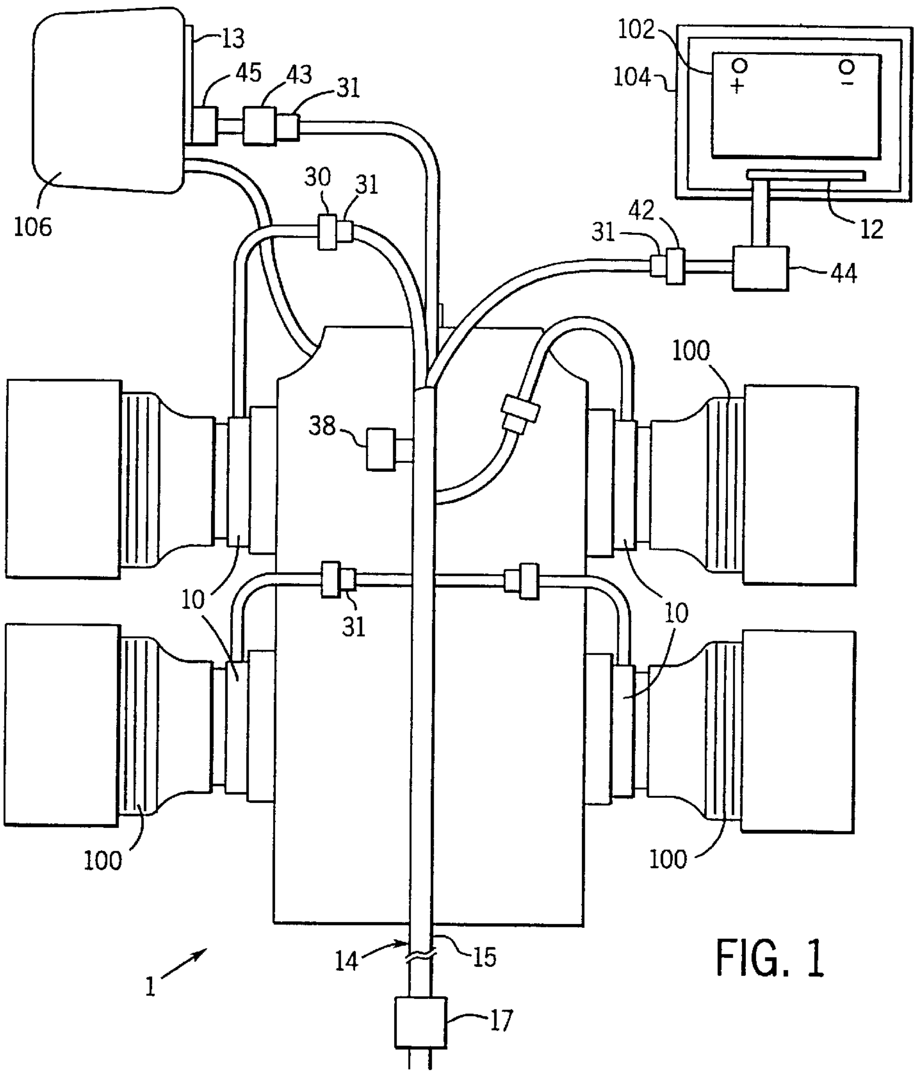
FIG. 1
FIG. 3
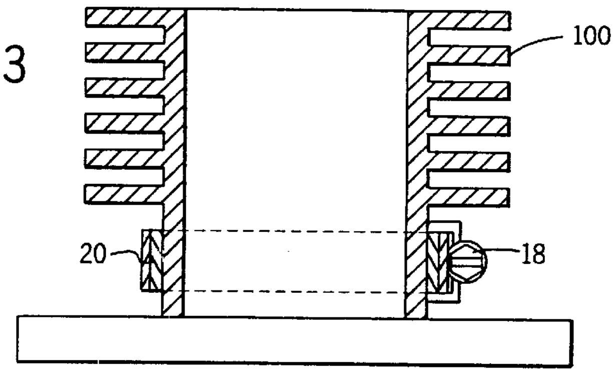

APPARATUS AND METHOD FOR HEATING COLD ENGINES

CROSS-REFERENCES TO RELATED APPLICATIONS

This is a continuation-in-part application of Ser. No. 09/112,837 filed on Jul. 10, 1998, now U.S. Pat. No. 6,018,137.

BACKGROUND OF THE INVENTION

1. Field of the Invention

The present invention relates generally to heating engines and more specifically to an apparatus and method for heating cold cylinders, batteries, and oil sumps.

2. Discussion of the Prior Art

At low temperatures it is often difficult to start internal combustion engines, due to reduced vaporization of fuel, thickened engine oil, reduced battery power, and frost formation on spark plugs. Further, starting an engine in cold weather can cause excessive wear and damage to its internal parts, because of poor oil flow. Wear and damage may also be caused by differing rates of expansion of mating parts made from dissimilar metals. For example, the aluminum pistons expand at a faster rate during startup than the steel cylinders do, which may cause the piston to scuff the cylinder wall.

A common method of preheating aircraft and other engines is to force heated air into an engine compartment. This method is inconvenient because it requires time consuming set-up. The equipment is also not small and light enough to be carried in the aircraft or vehicle. Using a combustion type heater as opposed to an electric heater may be unsafe due to the open flame which heats the forced air.

There are several patents directed at preheating engines. U.S. Pat. No. 3,953,707 to Tanis discloses a method of preheating air cooled aircraft engines by insertion of electric heating devices into blind holes in a cylinder head, normally provided for the reception of thermocouples. The drawback to this design is that the heating element and a thermocouple cannot be simultaneously inserted into the same blind hole. This invention cannot be installed in engines which have no thermocouple holes in the cylinder heads. U.S. Pat. No. 5,196,673 to Tanis discloses an aircraft intake pipe bolt heater. A drawback to both Tanis patents is that both designs directly heat the cylinder head, not the cylinder.

Accordingly, there is a clearly felt need in the art for an apparatus and method for heating cold engines which does not require extensive set-up, does not require extensive disassembly, does not require storage, but provides direct heating of the cylinder, battery, and oil sump.

SUMMARY OF THE INVENTION

The primary objective of the present invention is to provide an apparatus and method for heating cold engines which does not require extensive set-up, does not require extensive disassembly, does not require storage, but provides direct heating of the cylinder, battery, and oil sump.

According to the present invention, an apparatus for heating a cold engine includes a cylinder band heater, a battery heater, an oil sump heater, and a wiring harness. The cylinder band heater includes a heating element, a tightening device, and a cylinder electrical connector. The heating element includes a heating device and insulating layers. The heating device is preferably, a nichrome wire, or a resistive foil element. The nichrome wire is preferably wrapped around a carrier element such as a fiberglass cord. The heating device is sandwiched between first and second insulating layers. The insulating layers are preferably fabricated from silicone fiberglass cloth.

The tightening device is preferably a hose clamp, but could be any other type of tightening device which may be securely fastened around a cylinder. The heating element is attached to either the inside or outside of the tightening device with some type of adhesive. Preferably, the heating element is attached to the inside thereof for better heat transfer to the cylinder. The cylinder electrical connector includes a two pin connector, a first wire, and a second wire. The first wire is electrically connected to one pin of the two pin connector. The second wire is electrically connected to a second pin in the two pin connector. Each wire is electrically connected to each end of the heating device. All electrical connections are insulated. A thermostat may also be included in the wiring harness to monitor the temperature inside the engine compartment.

A battery heater includes a battery heater element, and a battery electrical connector. The heating element includes a heating device and insulating layers. The heating device is preferably, a nichrome wire or resistive foil element. The resistive foil element is formed by etching thereof from a copper pad, similar to etching runs on a circuit board. The heating device is sandwiched between first and second insulating layers. The insulating layers are preferably fabricated from silicone fiberglass cloth. The electrical connector includes a two pin connector, a first wire, and a second wire. The first wire is electrically connected to one pin of the two pin connector. The second wire is electrically connected to a second pin in the two pin connector. Each wire is electrically connected to each end of the heating device. All electrical connections are insulated. A thermostat is preferably included between the battery electrical connector and the heating element to keep the temperature relatively constant. The construction of oil sump heater is similar to the battery heater except that the oil sump heater has a higher wattage rating and the thermostat has a higher temperature range. The oil sump heater is attached to a bottom of an oil sump.

A second embodiment of a cylinder band heater utilizes a pair of extension tabs attached to each end of a flexible heating element. A third embodiment of a cylinder band heater utilizes a resilient clamp with a flexible heating element preferably attached to an inside thereof. A fourth embodiment of a cylinder band heater utilizes a tubular type heater which is formed into a circular shape with a pair of turned-up ends. The turned-up ends are pulled against each other with a screw, spring, or any other suitable clamping device. A fifth embodiment of a cylinder band heater utilizes a commercially available band heater. A sixth embodiment of a cylinder band heater utilizes a locking tie (similar to a nylon locking or bundling tie) with a heating element attached thereto.

The wiring harness includes at least one wiring harness connector and a power cord. Each wiring harness connector has two pins. Each pin has a wire attached thereto. The length of the wires connected to each wiring harness connector is dependent upon the position of heating element in the engine compartment. The first wires are connected in parallel and the second wires are connected in parallel.

The apparatus for heating cold engines is installed in the following manner. At least one cylinder band heater is attached to a cylinder. Preferably, the cylinder band heater is attached to the non-heat sink area of the cylinder. The cylinder electrical connector is plugged into the mating wiring harness connector. If a battery heater is used, the battery heater is placed near the battery to heat thereof. The battery electrical connector is plugged into the mating wiring harness connector. If an oil sump heater is used, it is attached to an oil sump with any suitable adhesive. The plug of the wiring harness is plugged into an extension cord and the extension cord plugged into a power source.

Accordingly, it is an object of the present invention to provide an apparatus for heating a cold engine which has a heating element for warming a cylinder in cold weather.

It is a further object of the present invention to provide an apparatus for heating a cold engine which has a heating element for warming a battery in cold weather.

It is yet a further object of the present invention to provide an apparatus for heating a cold engine which has a heating element for warming an oil sump in cold weather.

It is yet a further object of the present invention to provide an apparatus for heating a cold engine which does not require extensive set-up.

It is yet a further object of the present invention to provide an apparatus for heating a cold engine which does not require extensive disassembly.

It is yet a further object of the present invention to provide an apparatus for heating a cold engine which does not require storage.

Finally, it is another object of the present invention to provide an apparatus for heating a cold engine which directly heats a cylinder instead of an intake pipe, or a cylinder head.

These and additional objects, advantages, features and benefits of the present invention will become apparent from the following specification.

BRIEF DESCRIPTION OF THE DRAWINGS

FIG. 1 is a top view of an aircraft engine and battery with an apparatus for heating a cold engine attached thereto in accordance with the present invention.

FIG. 3 is a cross sectional view of a cylinder with a cylinder band heater attached thereto in accordance with the present invention.

DETAILED DESCRIPTION OF THE PREFERRED EMBODIMENTS

Figure 2:
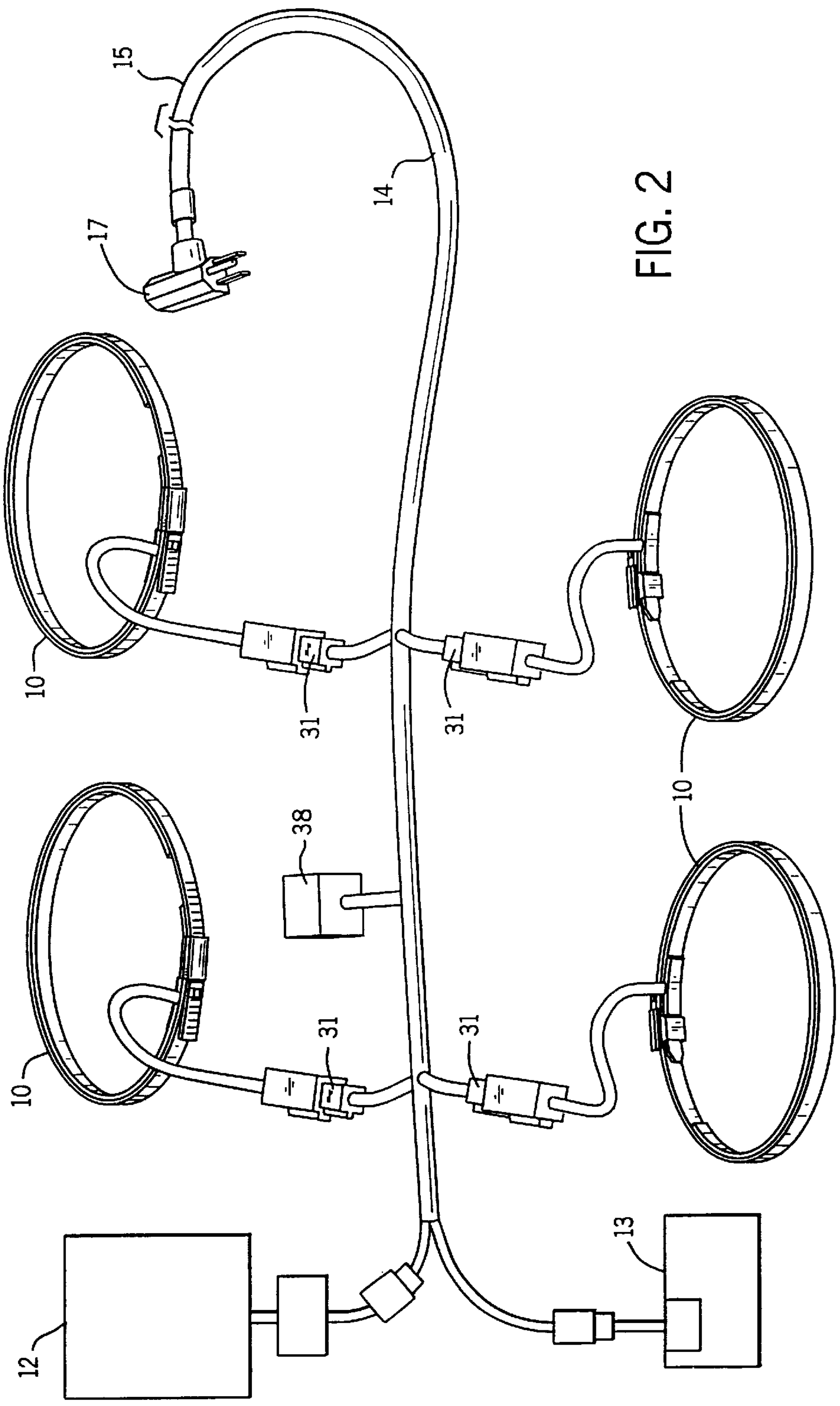
FIG. 2 is a top view of an apparatus for heating a cold engine in accordance with the present invention.
Figure 4:
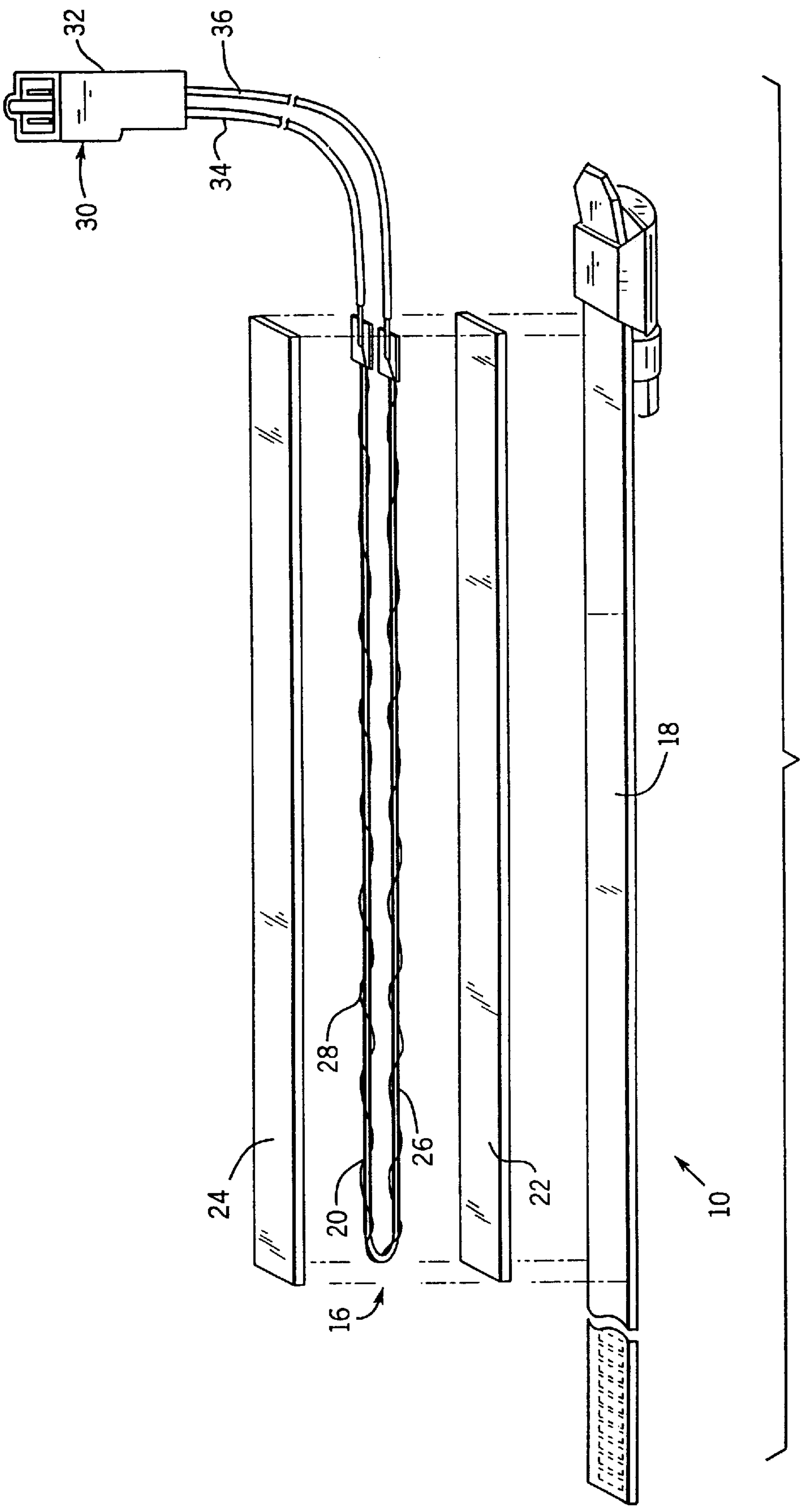
FIG. 4 is an exploded perspective view of a cylinder band heater in accordance with the present invention.

With reference now to the drawings, and particularly to FIG. 1, there is shown an apparatus for heating a cold engine 1. With reference to FIG. 2, the apparatus for heating a cold engine 1 includes a cylinder band heater 10, a battery heater 12, an oil sump heater 13, and a wiring harness 14. With reference to FIG. 4, the cylinder band heater 10 includes a heating element 16, a tightening device 18, and a cylinder electrical connector 30. The heating element 16 includes a heating device 20, a first insulating layer 22 and a second insulating layer 24. The heating device 20 is preferably fabricated from a nichrome wire, or a resistive foil element. The heating device 20 could be fabricated from other wires or other resistive elements, but nichrome wire and resistive foil are preferable, because they provide the best performance and value. The heating device 20 may be powered by DC or AC voltage. Electrical current passes through the heating device 20 and produces heat energy which is conducted through either insulating layer. Preferably, the nichrome wire 28 is wrapped around a carrier element 26 such as a fiberglass cord. The insulating layers are preferably fabricated from silicone fiberglass cloth. The heating device 20 is sandwiched between the first and second insulating layers.

The tightening device 18 is preferably a hose clamp, but could be any other type of tightening device which may be securely fastened around a cylinder. The width and length of the tightening device 18 may be modified for different sizes of cylinders. The heating element 16 is preferably substantially the same width as the tightening device 18. The heating element 16 is attached to either the inside or outside of the tightening device 18 with preferably some type of adhesive. Preferably, the heating element 16 is attached to the inside of the tightening device 18 for better heat transfer to the cylinder 100. The tightening device 18 could be eliminated by bonding the heating element 16 to the cylinder 100 with any suitable adhesive.

Figure 6A:
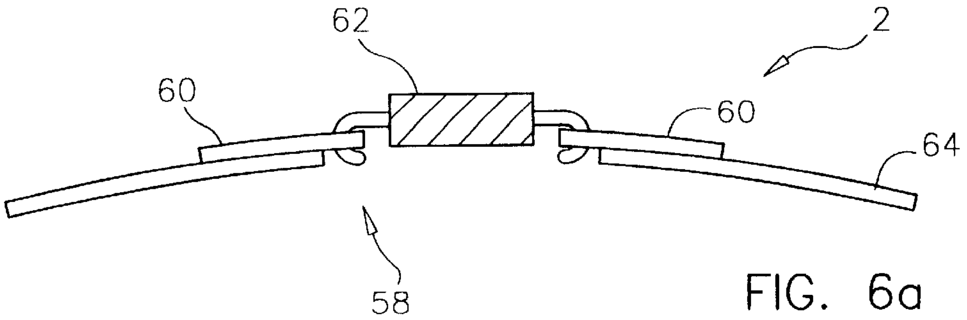
FIG. 6*a* is a partial side view of a second embodiment of a cylinder band heater utilizing a pair of flat extension tabs attached to each end of a flexible heating element in accordance with the present invention.
Figure 6B:
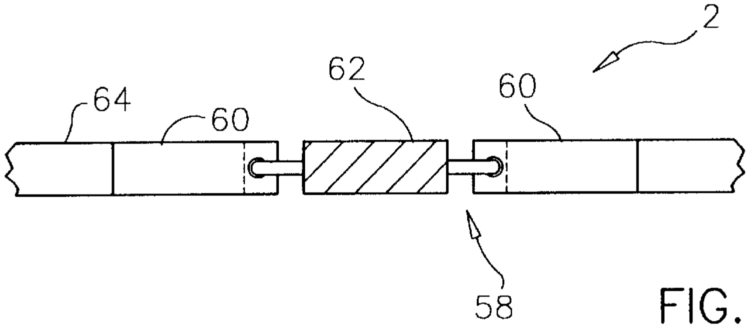
FIG. 6*b* is a partial top view of a second embodiment of a cylinder band heater utilizing a pair of flat extension tabs attached to each end of a flexible heating element in accordance with the present invention.

FIGS. 6*a* and 6*b* show a second embodiment of a cylinder band heater 2 which includes a flexible heating element 64 and a tightening device 58. The tightening device 58 includes a pair of tab extensions 60 and a tension spring 62. Each end of the tension spring 62 is inserted into a hole in each tab extensions 60. The tab extensions 60 are attached to the flexible heating element 64 with any suitable assembly process. The cylinder band heater 2 is installed by wrapping the flexible heating element 64 around a cylinder and pulling the tab extensions 60 together and attaching the tension spring 62.

Figure 6C:
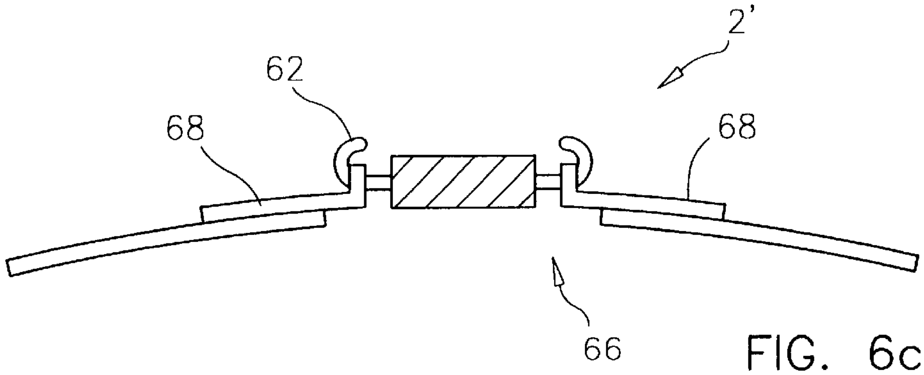
FIG. 6*c* is a partial side view of a second embodiment of a cylinder band heater utilizing a pair of right angle extension tabs attached to each end of a flexible heating element in accordance with the present invention.
Figure 6D:
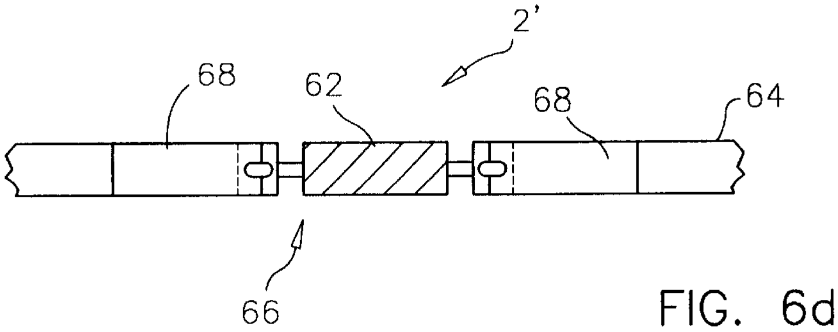
FIG. 6*d* is a partial top view of a second embodiment of a cylinder band heater utilizing a pair of right angle extension tabs attached to each end of a flexible heating element in accordance with the present invention.

FIGS. 6*c* and 6*d* show a second embodiment of a cylinder band heater 2' which includes a flexible heating element 64 and a tightening device 66. The tightening device 66 includes a pair of right angle tab extensions 68 and a tension spring 62. Each end of the tension spring 62 is inserted into a hole in each right angle tab extension 68. The pair of right angle tab extensions 68 are attached to a flexible heating element 64 with any suitable assembly process. The cylinder band heater 2' is installed by wrapping the flexible heating element 64 around a cylinder and pulling the right angle tab extensions together and attaching the tension spring 62.

Figure 7:
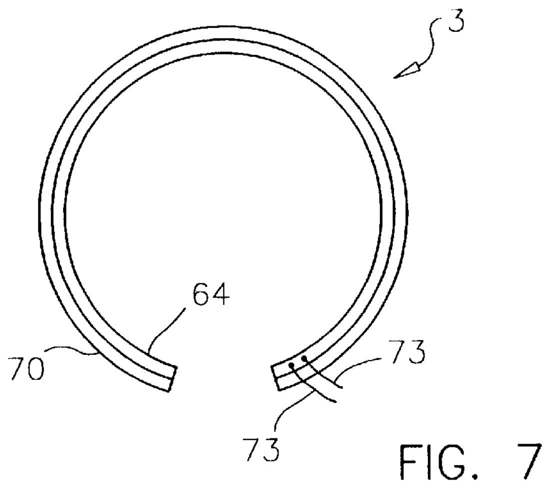
FIG. 7 is a side view of a third embodiment of a cylinder band heater utilizing a resilient clamp in accordance with the present invention.

FIG. 7 shows a third embodiment of a cylinder band heater 3. The cylinder band heater 3 includes a resilient clamp 70 and a flexible heating element 64. A pair of electrical wires 73 extend from the flexible heating element 64. The resilient clamp 70 may be fabricated from spring steel, DELRIN plastic, or any other material with suitable resilient properties. DELRIN is a registered trademark of E. I. DuPont Demours and Co. of Wilimington, Delaware. The flexible heating element 64 is preferably attached to an inside of the resilient clamp 70 with any suitable assembly process. The cylinder band heater 3 is installed by pulling the ends of the resilient clamp 70 away from each other to clear the diameter of a cylinder. The resilient clamp 70 has enough hoop force to ensure contact between the flexible heating element 64 and the cylinder.

Figure 8:
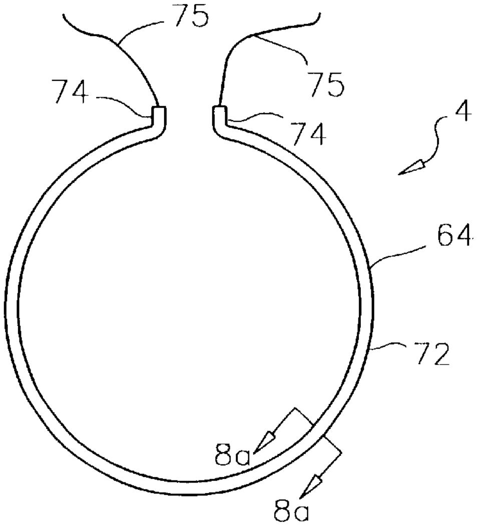
FIG. 8 is a side view of a fourth embodiment of a cylinder band heater utilizing a tubular type cylinder band heater in accordance with the present invention.
Figure 8A:
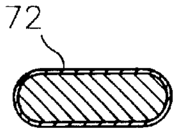
FIG. 8*a* is a cross-sectional view of a tubular type cylinder band heater in accordance with the present invention.

FIGS. 8 show a fourth embodiment of a cylinder band heater 4. The cylinder band heater 4 includes a tubular heating element 72 which is bent into a circular shape. With reference to FIG. 8*a*, the cross section of the tubular heating element 72 preferably has an oval shape, but could be any other suitable shapes. A pair of electrical wires 75 extend from the flexible heating element 64. The tubular heating element 72 is preferably fabricated from a soft metal which is easily bendable to the shape required. The tubular heating element 72 may be fastened to the cylinder by bonding with an adhesive, or utilizing a tightening device. The tightening device could be implemented by pulling turn-up ends 74 together with a spring, or attaching tabs and using some type of fastener to pull the attaching tabs together.

Figure 9:
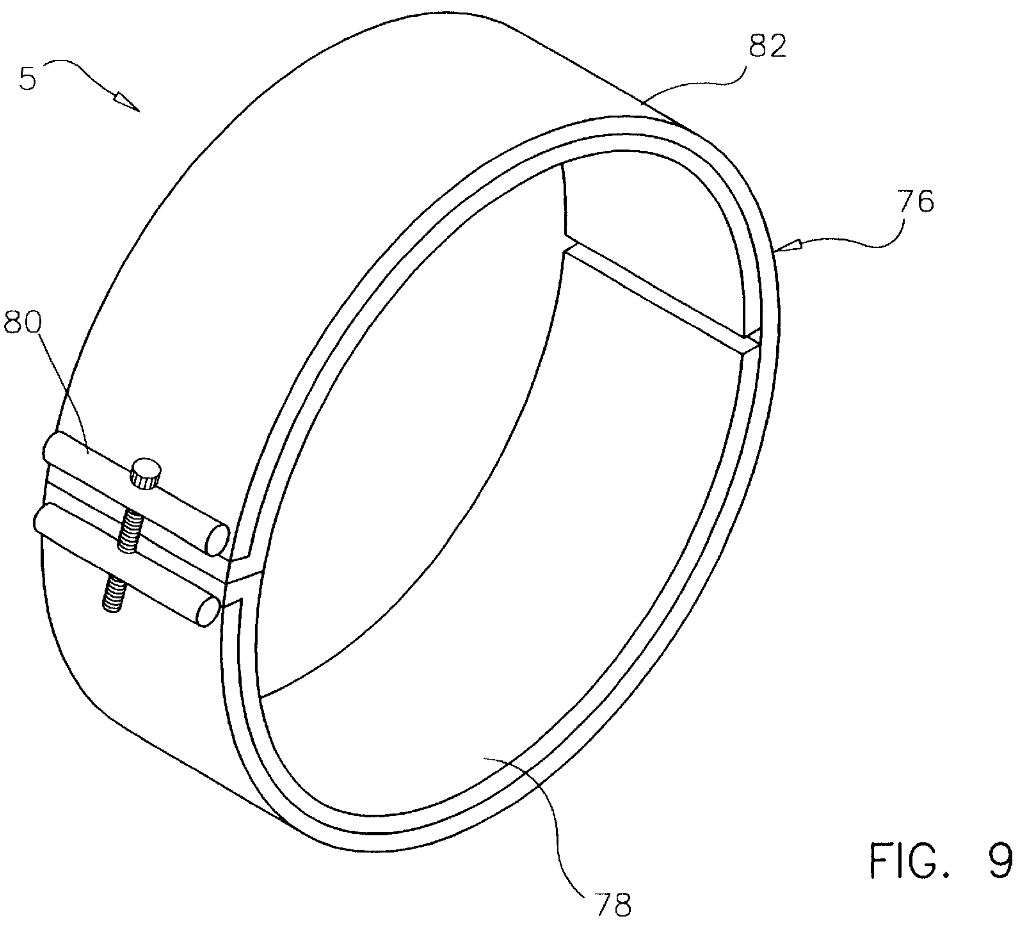
FIG. 9 is a perspective view of one type of commercially available cylinder band heater in accordance with the present invention.

FIG. 9 shows a fifth embodiment of a cylinder band heater 5. The cylinder band heater 5 includes a tightening device 76 and a heating element 78. The tightening device 76 includes a tensioning device 80 and a tensioning band 82. The heating element 78 is affixed to an inside of the tensioning band 82. The cylinder band heater 5 is a commercially available device which comes in any number of styles with and different types of tensioning devices. One such company that sells the cylinder band heater 5 is BH Thermal Corporation of Columbus, Ohio.

Figure 10:
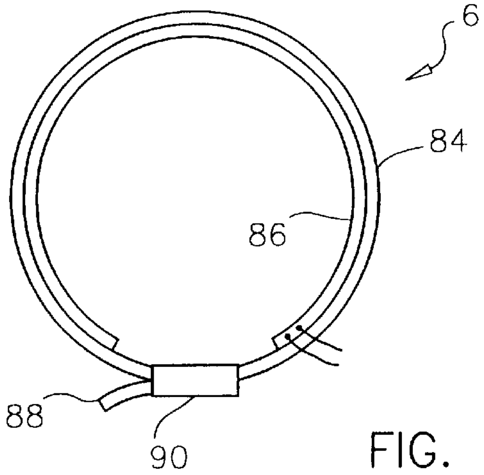
FIG. 10 is a side view of a sixth embodiment of cylinder band heater in accordance with the present invention.

FIG. 10 shows a sixth embodiment of a cylinder band heater 6. The cylinder band heater 6 includes a tightening device 84 and a heating element 86. The tightening device 84 is a locking tie. The locking tie is preferably fabricated from stainless steel, but could be fabricated of other materials such as aluminum, galvanized steel, or a high temperature non-metal. A stainless steel tie may be purchased from WAYTEK, Inc. of Minneapolis, Minn. The heating element 86 is preferably attached to an inside of the tightening device 84. The cylinder band heater 6 is attached to a cylinder by wrapping thereof around the cylinder and inserting a first end 88 of the tightening device 84 into a female retention device 90. The first end 88 is pulled until the heating element 86 is snug against the cylinder.

With reference to FIG. 4, the cylinder electrical connector 30 includes a two pin connector 32, a first wire 34, and a second wire 36. The first wire 34 is electrically connected to one pin of the cylinder electrical connector 30. The second wire 36 is electrically connected to a second pin in the cylinder electrical connector 30. Each wire is electrically connected to each end of the heating device. All electrical connections are preferably insulated. A thermostat 38 may be included as part of the wiring harness 14. The thermostat 38 would be preferably connected in series with the hot wire of the AC cord. The thermostat 38 would be disposed on a portion of wiring harness 14 that is within the engine compartment. It is preferable that the temperature range of the thermostat be between 72 to 80 degrees Fahrenheit. A thermostat with an adjustable temperature range could also be used. The thermostat 38 is preferably of the bi-metal type, but other types could be used.

Figure 5:
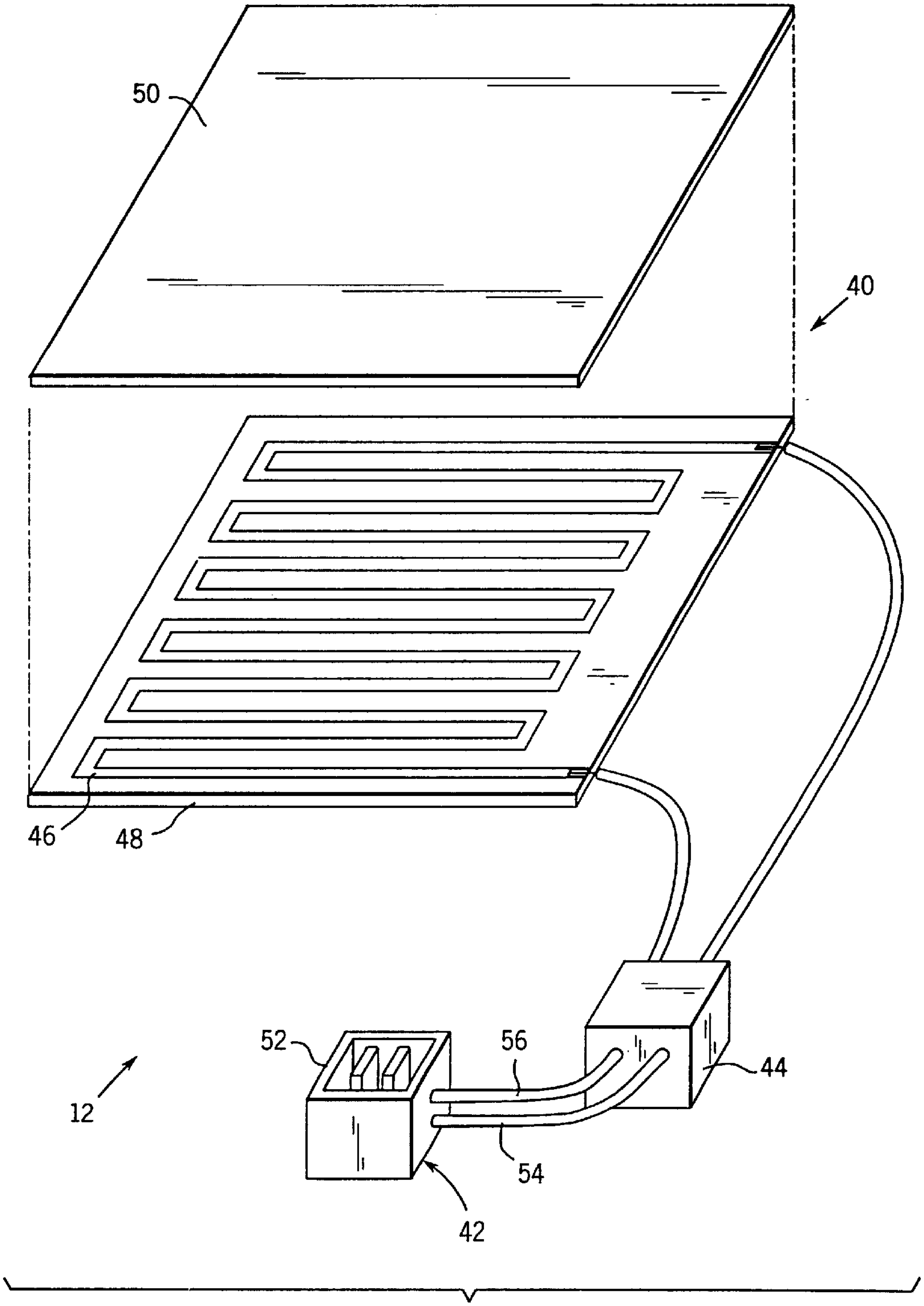
FIG. 5 is an exploded perspective view of a battery or oil sump heater in accordance with the present invention.

With reference to FIG. 5, a battery heater 12 includes a battery heating element 40, a thermostat 44, and a battery electrical connector 42. The heating element 40 includes a heating device 46 a first insulating layer 48 and, a second insulating layer 50. The heating device 46 is preferably, a resistive foil element. The resistive foil element is formed by depositing a thin layer of copper on one of the insulating layers. A pattern is acid etched using a mask. The heating device 46 is sandwiched between the first insulating layer 48 and the second insulating layer 50. The insulating layers are preferably fabricated from silicone fiberglass cloth. The heating device 46 may also be fabricated from nichrome wire and a carrier element instead of the resistive foil element.

The oil sump heater 13 is constructed similar to the battery heater 12. The oil sump heater has a thermostat 45 which has a preferable temperature range of between 140 to 150 degrees Fahrenheit. The oil sump heater 13 has a higher wattage than that of the battery heater 12 to maintain the oil in the oil sump 106 at a temperature near the thermostat range. The back of the oil sump heater 13 is bonded to the oil sump 106 with any appropriate adhesive. The oil sump electrical connector 43 mates with the wiring harness connectors 31.

The battery electrical connector 42 includes a two pin connector 52, a first wire 54, and a second wire 56. The first wire 54 is connected to one pin of the two pin connector 52. The other end of the first wire 54 is electrically coupled to one end of the heating device 46 through the thermostat 44. The second wire 56 is electrically connected to a second pin of the two pin connector 52. The other end of the second wire 56 is electrically coupled to the other end of the heating device 46 through the thermostat 44. All electrical connections are insulated. The thermostat 44 is preferably included between the wiring harness 14 and the heating element 46 to keep the temperature relatively constant. It is preferable that the temperature range of the thermostat be between 72 to 80 degrees Fahrenheit. The thermostat 44 is preferably of the bi-metal type, but other types could be used.

The wiring harness 14 includes at least one wiring harness connector 31 and an AC power cord 15. The AC power cord 15 includes an AC plug 17 which mates with a 120 volt extension cord. The apparatus for heating a cold engine 1 could also run off 220 VAC with a 220 VAC plug. Each wiring harness connector 31 mates; with the cylinder electrical connector 30, the battery electrical connector 42, or the oil sump electrical connector 43. A first wire is attached to one of the pins of the wiring harness connector 31, and a second wire is attached to a second pin thereof. The length of the wires connected to each wiring harness connector 31 are dependent upon the position of the particular heating element in the engine compartment. The first wires from each wiring harness connector 31 are connected in parallel and the second wires from each wiring harness connector 31 are connected in parallel.

The apparatus for heating cold engines 1 is installed in the following manner. With reference to FIG. 3, at least one cylinder band heater 10 is tightened around a cylinder 100. Preferably, the cylinder band heater 10 is tightened around the non-heat sink area of the cylinder 100 to facilitate better heat transfer to thereof. The cylinder electrical connector 30 is then plugged into the mating wiring harness connector 31. The battery heater 12 may be inserted into a battery housing 104 with or without attaching the battery heater 12 to a battery 102. The battery heater 12 may also be attached directly to the outside of the battery housing 104. The battery electrical connector 42 is plugged into the mating wiring harness connector 31. If an oil sump heater is used, an area of the oil sump 106 is cleaned. The oil sump heater 13 is applied to the cleaned area on the oil sump 106. The AC plug 17 of the wiring harness 14 is plugged into an extension cord and the extension cord is plugged into a power source.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An apparatus for heating cold engines comprising:

a wiring harness being connected to a power source;

at least one cylinder band heater including a tightening device and a heating element, said tightening device being tightened around a non-heat sink area of a cylinder, said heating element being attached to said tightening device, said wiring harness supplying current to said heating element.

2. The apparatus for heating cold engines of claim 1, further comprising:

a thermostat being connected in series with said wiring harness, said thermostat being disposed such that it is within the engine compartment.

3. The apparatus for heating cold engines of claim 1, further comprising:

said tightening device being a hose clamp.

4. The apparatus for heating cold engines of claim 1, further comprising:

said tightening device being a pair of tabs and a spring, a single said tab being attached to each end of said heating element, said spring pulling said pair of tabs together to provide contact between said cylinder band heater and the cylinder.

5. The apparatus for heating cold engines of claim 1, further comprising:

said tightening device being a resilient clamp, said heating element being attached to said resilient clamp, said resilient clamp being pulled apart to attach thereof to the cylinder.

6. The apparatus for heating cold engines of claim 1, further comprising:

said heating element and said tightening device being embodied by a tubular type heater, said tubular type heater having ends which may be pulled toward each other to fasten said tubular type heater to the cylinder.

7. The apparatus for heating cold engines of claim 1, further comprising:

said heating element and tightening device being a commercial available cylinder band heater.

8. The apparatus for heating cold engines of claim 1, further comprising:

said heating element having a heating device which is sandwiched between a first insulating layer and a second insulating layer.

9. The apparatus for heating cold engines of claim 1, further comprising:

a battery heater being electrically connected to said wiring harness, said battery heater providing heat to a battery.

10. The apparatus for heating cold engines of claim 9, further comprising:

said battery heater having a heating device sandwiched between a first insulating layer and a second insulating layer, said heating device being connected to said wiring harness.

11. The apparatus for heating cold engines of claim 10, further comprising:

a thermostat being connected between said wiring harness and said battery heater.

12. The apparatus for heating cold engines of claim 9, further comprising:

a wiring harness connector extending from said wiring harness for each said heating element, said battery heater being terminated with a battery electrical connector, each said cylinder band heater being terminated with a cylinder electrical connector, said battery electrical connector mating with said wiring harness connector, said cylinder electrical connector mating with said wiring harness connector.

13. The apparatus for heating cold engines of claim 12, further comprising:

an oil sump heater being terminated with an oil sump electrical connector, said oil sump electrical connector mating with said wiring harness connector.

14. The apparatus for heating cold engines of claim 1, further comprising:

said tightening device being a locking tie, said heating element being attached to said locking tie, said locking tie being wrapped around the cylinder and tightened around thereof.

15. An apparatus for heating cold engines comprising:

a wiring harness being connected to a power source;

an oil sump heater being electrically connected to said wiring harness, said oil sump heater providing heat to an oil sump; and at least one cylinder band heater including a tightening device and a heating element, said tightening device being tightened around a non-heat sink area of a cylinder, said heating element being attached to said heater band, said wiring harness supplying current to said heating element.

16. The apparatus for heating cold engines of claim 15, further comprising:

a thermostat being connected in series with said wiring harness, said thermostat being disposed such that it is within the engine compartment.

17. The apparatus for heating cold engines of claim 15, further comprising:

said tightening device being a hose clamp.

18. The apparatus for heating cold engines of claim 15, further comprising:

said tightening device being a pair of tabs and a spring, a single tab being attached to each end of said heating element, said spring pulling said pair of tabs together to provide contact between said cylinder band heater and the cylinder.

19. The apparatus for heating cold engines of claim 15, further comprising:

said tightening device being a resilient clamp, said heating element being attached to said resilient clamp, said resilient clamp being pulled apart to attach thereof to the cylinder.

20. The apparatus for heating cold engines of claim 15, further comprising:

said heating element and said tightening device being embodied by a tubular type heater, said tubular type heater having ends which may be pulled toward each other to fasten said tubular type heater to the cylinder.

21. The apparatus for heating cold engines of claim 15, further comprising:

said heating element and said tightening device being a commercially available cylinder band heater.

22. The apparatus for heating cold engines of claim 15, further comprising:

said heating element having a heating device which is sandwiched between a first insulating layer and a second insulating layer.

23. The apparatus for heating cold engines of claim 15, further comprising:

a battery heater being electrically connected to said wiring harness, said battery heater providing heat to a battery.

24. The apparatus for heating cold engines of claim 23, further comprising:

said battery heater having a heating device sandwiched between a first insulating layer and a second insulating layer, said heating device being connected to said wiring harness.

25. The apparatus for heating cold engines of claim 15, further comprising:

a thermostat being connected between said wiring harness and said battery heater.

26. The apparatus for heating cold engines of claim 15, further comprising:

a wiring harness connector extending from said wiring harness for each said heating element, said battery heater being terminated with a battery electrical connector, each said cylinder band heater being terminated with a cylinder electrical connector, said battery electrical connector mating with said wiring harness connector, said cylinder electrical connector mating with said wiring harness connector.

27. The apparatus for heating cold engines of claim 26, further comprising:

said oil sump heater being terminated with an oil sump electrical connector, said oil sump electrical connector mating with said wiring harness connector.

28. The apparatus for heating cold engines of claim 15, further comprising:

said tightening device being a locking tie, said heating element being attached to said locking tie, said locking tie being wrapped around the cylinder and tightened around thereof.

29. An apparatus for heating cold engines comprising:

a wiring harness being connected to a power source;

at least one heating element being fastened around a non-heat sink area of a cylinder, said wiring harness supplying current to said heating element.

30. The apparatus for heating cold engines of claim 29, further comprising:

a thermostat being connected in series with said wiring harness, said thermostat being disposed such that it is within the engine compartment.

31. The apparatus for heating cold engines of claim 29, further comprising:

said heating element having a heating device which is sandwiched between a first insulating layer and a second insulating layer.

32. The apparatus for heating cold engines of claim 29, further comprising:

a battery heater being electrically connected to said wiring harness, said battery heater providing heat to a battery.

33. The apparatus for heating cold engines of claim 32, further comprising:

said battery heater having a heating device sandwiched between a first insulating layer and a second insulating layer, said heating device being connected to said wiring harness.

34. The apparatus for heating cold engines of claim 33, further comprising:

a thermostat being connected between said wiring harness and said battery heater.

35. The apparatus for heating cold engines of claim 32, further comprising:

a wiring harness connector extending from said wiring harness for each said heating element, said battery heater being terminated with a battery electrical connector, each said cylinder band heater being terminated with a cylinder electrical connector, said battery electrical connector mating with said wiring harness connector, said cylinder electrical connector mating with said wiring harness connector.

36. The apparatus for heating cold engines of claim 35, further comprising:

an oil sump heater being terminated with an oil sump electrical connector, said oil sump electrical connector mating with said wiring harness connector.

* * * * *